United States Patent [19]

Langa et al.

[11] Patent Number: 4,880,167

[45] Date of Patent: Nov. 14, 1989

[54] IRRIGATION HOSE WITH LINEAR TURBULENT FLOW EMITTER

[75] Inventors: John M. Langa, Alpine; Michael J. Boswell, Lakeside; Kermit R. Littleton, Julian, all of Calif.

[73] Assignee: James Hardie Irrigation, Inc., Laguna Niguel, Calif.

[21] Appl. No.: 242,706

[22] Filed: Sep. 13, 1988

Related U.S. Application Data

[63] Continuation-in-part of Ser. No. 100,296, Sep. 23, 1987, abandoned.

[51] Int. Cl.$^4$ .............................................. B05B 15/00
[52] U.S. Cl. ..................................... 239/542; 239/547
[58] Field of Search ............... 239/542, 547, 500, 502, 239/512

[56] References Cited

U.S. PATENT DOCUMENTS

| | | | |
|---|---|---|---|
| 3,870,236 | 3/1975 | Sahagun-Barragan | 239/542 |
| 3,874,598 | 4/1975 | Havens . | |
| 3,896,999 | 7/1975 | Barragan | 239/542 |
| 4,413,787 | 11/1983 | Gilead et al. | 239/542 |
| 4,473,191 | 9/1984 | Chapin | 239/542 |
| 4,474,330 | 10/1984 | Langa | 239/542 |
| 4,541,569 | 9/1985 | Langa | 239/542 |
| 4,626,130 | 12/1986 | Chapin | 239/542 |

FOREIGN PATENT DOCUMENTS 1555089 11/1979 United Kingdom .

Primary Examiner—Andres Kashnikow
Assistant Examiner—Christopher G. Trainor
Attorney, Agent, or Firm—Weissenberger & Peterson

[57] ABSTRACT

Turbulent-flow emitter channel sections are vacuum-formed in an extruded flat plastic strip. The strip is then applied to a hose substrate, and inlet and outlet openings are formed at opposite ends of the channel sections. The strip may be hot-melt bonded to the substrate during a co-extrusion process, or it may be applied to the hose substrate in a separate operation. Flow rates are easily controlled without changing the structure of the strip by varying the number of channel sections in which outlet openings are formed.

10 Claims, 2 Drawing Sheets

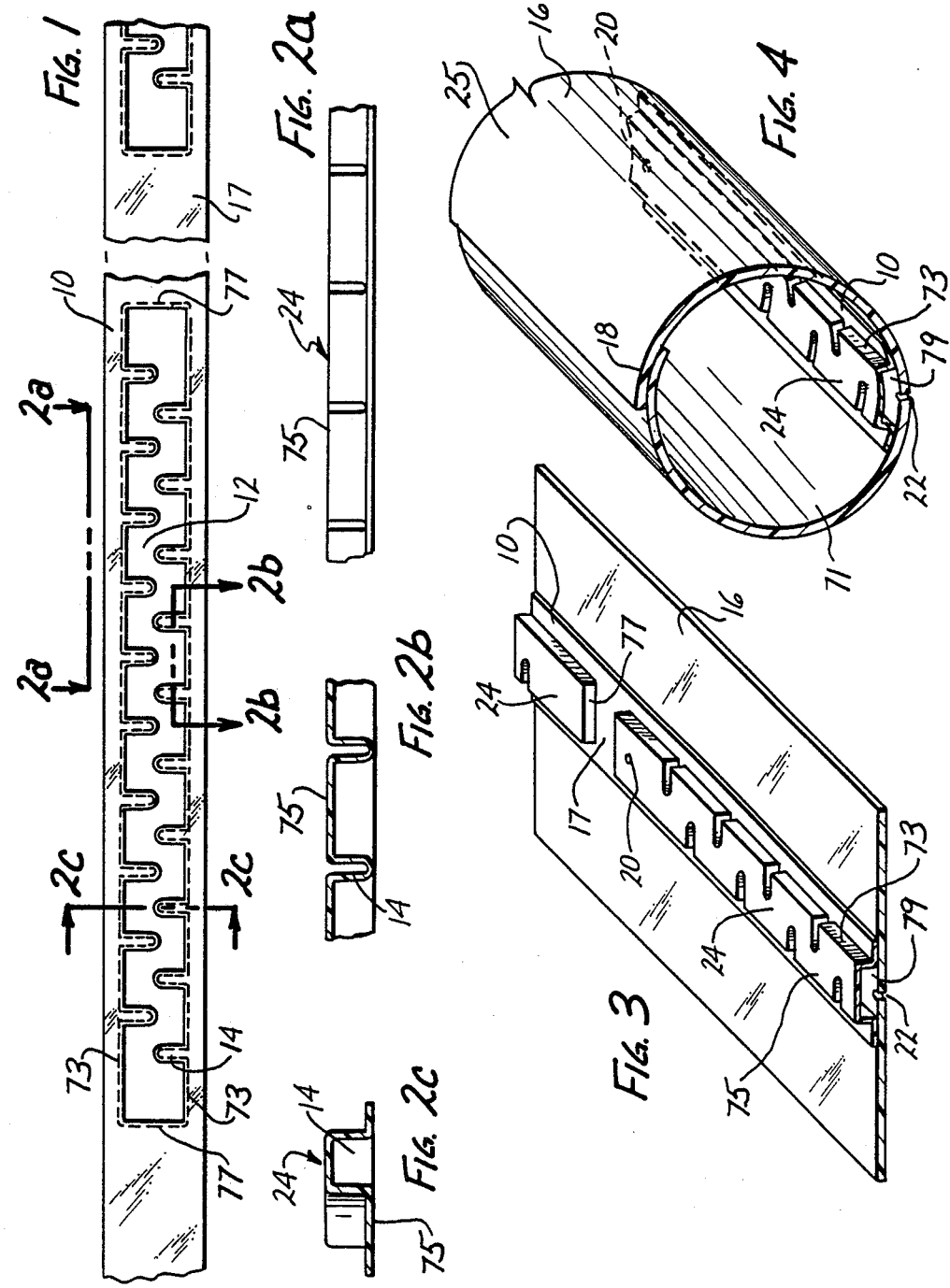

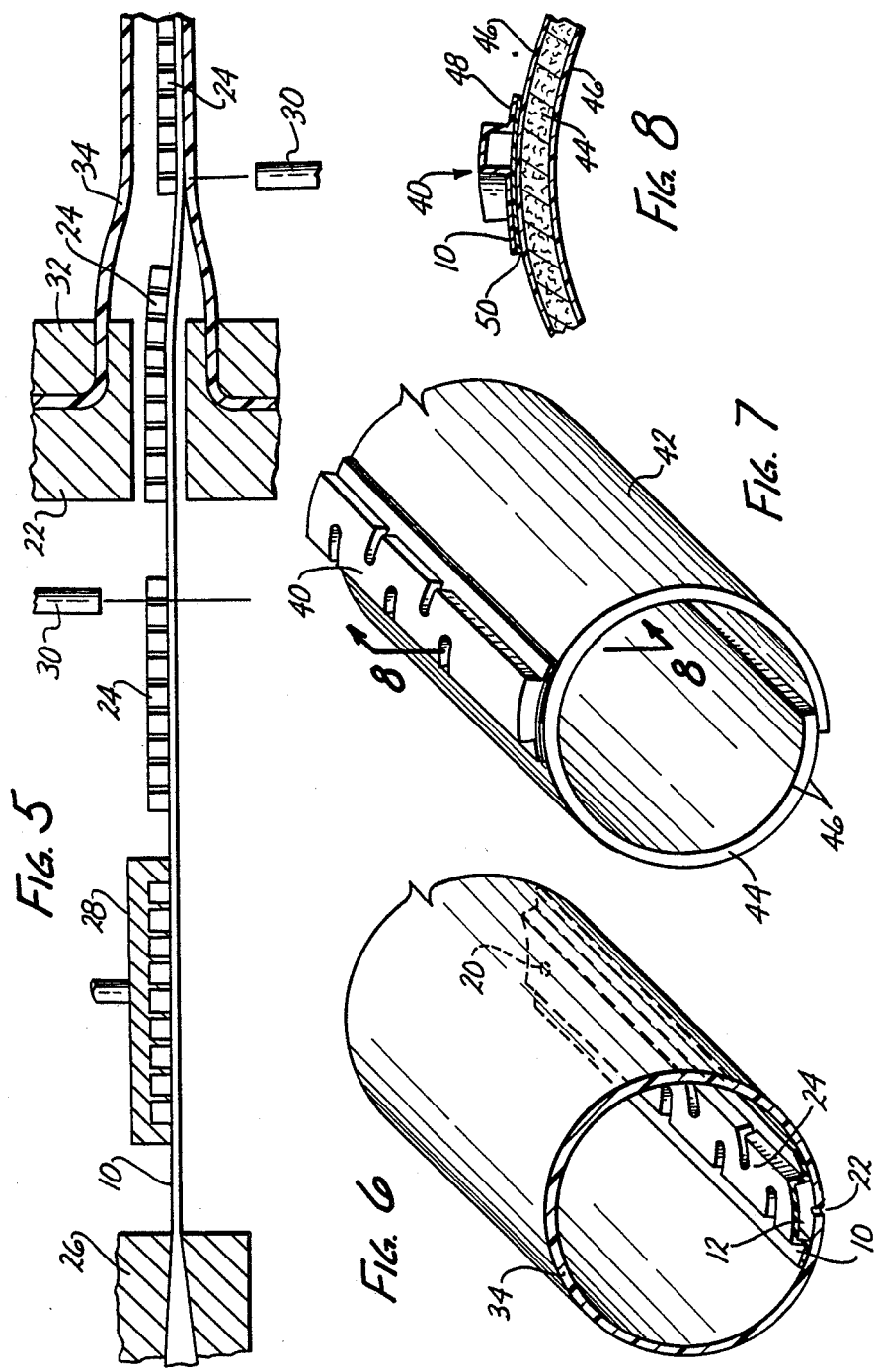

4,880,167

IRRIGATION HOSE WITH LINEAR TURBULENT FLOW EMITTER

RELATED CASES

This case is a continuation-in-part of application Ser. No. 07/100,296 filed Sept. 23, 1987, now abandoned.

FIELD OF THE INVENTION

This invention relates to agricultural irrigation hoses, and more particularly to hoses which incorporate linear turbulent flow emitters.

BACKGROUND

U.S. Pat. No. 4,474,330 discloses longitudinal tubular flow control devices incorporated in an irrigation hose by forming the hose as a flat sheet and bonding the edges of the sheet together over the control device. Though practical, this construction does not easily lend itself to the incorporation in the hose of turbulent flow emitters, nor is it easily adapted to the manufacture of fully extruded hose. U.S. Pat. No. 3,870,236 shows a continuous emitter strip of uniform thickness in a hose formed from a flat sheet, with turbulent flow passages formed in the emitter strip. This construction does not lend itself to the manufacture of fully extruded hose either. U.S. Pat. No. 4,413,787 shows turbulent flow passages formed in the hose body itself, which again is not feasible in fully extruded hose.

SUMMARY

The present invention allows separately formed spaced linear turbulent flow emitter to be incorporated into folded-film or fully extruded hoses in a single fabrication pass, or to be manufactured as separate continuous strips which can later be bonded to any desired hose substrate.

The invention accomplishes this result by extruding a thin flat strip of plastic material, deforming it (by an appropriate process such as, e.g., vacuum-forming or embossing) to produce the turbulent flow channels therein, and depositing the strip onto a preferably simultaneously extruded film or hose which both provides a seal for the turbulent flow channels and forms the hose carrying the water supply for the emitters. The strip may be placed on the inside or the outside of the hose, depending on the direction in which the film is folded. In the case of a fully extruded hose, the strip may be either deposited on the outside of the hose, or placed on the inside of the hose by feeding it through the center of the hose extrusion die during the extrusion of the hose.

Water inlet and outlet openings may be formed in the strip and hose before and/or after their assembly by conventional methods such as laser drilling. In this respect, various flow rates can be readily achieved by providing inlet openings on every channel section of the emitter strips while providing outlet openings on all or less than all of them.

It is the primary object of the invention to provide an extruded irrigation hose with spaced turbulent flow emitters in a single continuous manufacturing step.

It is another object of the invention to provide an extruded continuous strip of spaced turbulent flow emitters which can subsequently be bonded to any desired hose substrate.

BRIEF DESCRIPTION OF THE DRAWINGS

FIG. 1 is a plan view of a turbulent flow emitter strip according to this invention;

FIG. 2a is a partial side elevation of the strip of FIG. 1;

FIG. 2b is a section along line 2b—2b of FIG. 1;

FIG. 2c is a partial section along line 2c—2c of FIG. 1;

FIG. 3 is a perspective view of the hose of FIG. 4 before seaming;

FIG. 4 is a perspective view of a seamed extruded type of hose using the emitter strip of this invention;

FIG. 5 is a schematic diagram illustrating a manufacturing process for the hose of FIG. 6;

FIG. 6 is a perspective view of a fully extruded hose using the emitter strip of this invention;

FIG. 7 is a perspective view of another embodiment of the emitter strip of this invention as applied to a non-extruded substrate; and FIG. 8 is a section along line 8—8 of FIG. 7.

DETAILED DESCRIPTION OF THE DRAWINGS

FIGS. 1 and 2a through 2c show a thin flat extruded plastic strip 10 which has, at spaced intervals, been vacuum-formed or embossed to form a turbulent-flow channel 12 with flow-controlling interior walls 14. The channel 12 is open toward the bottom in FIGS. 2a through 2c. It will be noted that, in order to allow the preferred manufacturing method of vacuum-forming the strip 10 while still hot, the strip 10 is thin enough to form hollow walls 14, as best seen in FIG. 2b, around the teeth of the forming die. The thickness of the strip material is thus essentially the same at all points in the strip 10.

FIG. 3 shows the strip 10 deposited in sealing relationship on a film 16. Due to the thinness of the strip 10, it is easy to continuously form a unitary structure by extruding the strip 10 and the film 16 simultaneously and allowing them to contact each other while still hot so that they will melt-bond together. The thin flat shape of the strip 10 at 17 between the channel sections 24 provides a secure bonding of the strip 10 to the film 16 to reliably isolate the sections 24 from one another during hot-melt bonding.

As shown in FIG. 4, the film 16 may be folded and seamed in a conventional manner at 18 to form a hose or hose body 25 having a primary passage 71. Inlet openings 20 to the channel 12 may be formed in the strip 10 in any convenient manner, and outlet openings 22 may likewise be formed in the film 16 at the opposite end of each channel section 24.

As shown in FIGS. 1-4, each of the channel sections 24 has opposite side walls 73 joined by a transverse wall 75 and opposite end walls 77. The channel sections 24 are open toward the bottom and cooperate with the hose body 25 to provide a secondary passage 79. The inlet openings 20 lead from the primary passage 71 to the secondary passage 79 and outlet openings 22 lead from the secondary passage to the exterior of the hose.

The hollow walls 14 provide the turbulent flow in the secondary passage 79. As shown in FIGS. 1-4, the hollow walls open at the side walls 73 and transverse wall 75.

FIG. 5 illustrates, in schematic form, a manufacturing process for the fully extruded hose of FIG. 6. In FIG. 5, the strip 10 is extruded by a strip die 26. The channel sections 24 are then preferably formed by a vacuum die 28, and an inlet opening 20 is formed in each section 24 by a laser 30. The strip 10 is then drawn through the center of a hose die 32 which forms the hose 34 around the strip 10. At the exit of the hose die 32, the still hot strip 10 bonds itself to the interior wall of hose 34, and an outlet opening 22 can then be formed in the wall of hose 34 by a laser which is strong enough to penetrate the wall of hose 34 but not the material of strip 10.

FIG. 7 illustrates the application of a separately manufactured extruded and formed strip 40 to a non-extruded hose-forming substrate 42 which may, for example, be composed of a 25μ layer of paper or other biodegradable material 44 coated on each side with a 2.5μ layer 46 of a waterproof material such as plastic. In this embodiment, the strip 40 may be bonded to the hose substrate by an appropriate adhesive 48 (FIG. 8).

It will be seen that the present invention provides an efficient, fast method of incorporating linear turbulent flow emitters into irrigation hose. By forming inlet openings 20 in every channel section 24 of the strip 10, but forming outlet openings 22 at all or fewer than all sections 24, the total water flow per unit length of the hose can be adjusted within wide limits without changing the structure or fabrication of the strip 10.

We claim:

1. An irrigation hose, comprising:
    (a) a substrate forming a hose body;
    (b) an extruded linear strip bonded to said substrate longitudinally thereof;
    (c) said strip having spaced turbulent-flow channel sections formed in said strip;
    (d) each of said channel sections including a plurality of walls extending partially through said channel section alternately from opposite sides of the channel section;
    (e) said walls being hollow; and
    (f) said strip and substrate having water inlet and outlet openings formed therein at respectively opposite ends of said channel sections.

2. The hose of claim 1, which said substrate is composed of biodegradable material coated on both sides with a waterproof material.

3. The hose of claim 1, in which said substrate is a film whose edges are folded over and seamed together to form the hose body.

4. The hose of claim 1, in which said substrate is extruded in tubular form, said strip being positioned on the inside of said tubular substrate.

5. The hose of claim 1, in which said strip is hot melt bonded to said substrate.

6. An irrigation hose comprising:
    a hose body having a primary passage therein;
    a turbulent-flow section attached to the hose body and extending along the hose body;
    said turbulent flow section and said hose body cooperating to provide a secondary passage;
    an inlet leading from the primary passage to the secondary passage;
    an outlet leading from the secondary passage to the exterior of the irrigation hose;
    said turbulent flow section including means for creating a turbulent flow path in the secondary passage; and
    said creating means including hollow walls projecting into the secondary flow passage.

7. An irrigation hose as defined in claim 6 wherein the turbulent flow section has opposite side walls and said hollow walls extend inwardly from said side walls into the secondary passage.

8. An irrigation hose as defined in claim 6 wherein the turbulent flow section has opposite side walls joined by a transverse wall and said hollow walls open at said transverse wall.

9. An irrigation hose as defined in claim 6 wherein the turbulent flow section has opposite side walls joined by a transverse wall and said hollow walls open at said side walls.

10. An irrigation hose as defined in claim 6 wherein the turbulent flow section has opposite side walls joined by a transverse wall and said hollow walls open at said side walls and said transverse wall.

* * * * *